United States Patent
Brandt (10) Patent No.: US 10,285,389 B2
(45) Date of Patent: May 14, 2019

(54) SHIELDED POINT MOTION TACKLE

(71) Applicant: Thomas Elwood Brandt, Fort Myers, FL (US)

(72) Inventor: Thomas Elwood Brandt, Fort Myers, FL (US)

( * ) Notice: Subject to any disclaimer, the term of this patent is extended or adjusted under 35 U.S.C. 154(b) by 307 days.

(21) Appl. No.: 14/950,292

(22) Filed: Nov. 24, 2015

(65) Prior Publication Data

US 2016/0143258 A1    May 26, 2016

Related U.S. Application Data

(60) Provisional application No. 62/123,689, filed on Nov. 24, 2014.

(51) Int. Cl.
*A01K 83/00* (2006.01)
*A01K 85/02* (2006.01)
*A01K 97/06* (2006.01)

(52) U.S. Cl.
CPC .............. *A01K 85/02* (2013.01); *A01K 97/06* (2013.01)

(58) Field of Classification Search
CPC ........ A01K 83/00; A01K 83/02; A01K 85/02; A01K 91/10
See application file for complete search history.

(56) References Cited

U.S. PATENT DOCUMENTS

| | | | |
|---|---|---|---|
| 2,311,832 A * | 2/1943 | Helfenstein ............ | A01K 83/06 43/36 |
| 2,403,202 A * | 7/1946 | Woodward ............ | A01K 83/02 43/35 |
| 2,589,343 A * | 3/1952 | Cieslik ................... | A01K 85/02 43/35 |
| 2,596,564 A * | 5/1952 | Kautenberg ........... | A01K 83/02 43/34 |
| 3,727,340 A | 4/1973 | Harris | |
| 3,952,444 A * | 4/1976 | Hameen-Anttila .... | A01K 83/02 43/34 |
| 4,570,373 A | 2/1986 | Brief | |
| 4,723,372 A | 2/1988 | Moser | |
| 5,097,622 A | 3/1992 | James | |
| 5,491,925 A * | 2/1996 | Carpenter .............. | A01K 83/02 43/35 |
| 5,564,216 A * | 10/1996 | McMillan ............... | A01K 83/02 43/35 |
| 5,890,314 A | 4/1999 | Peters | |
| 6,574,908 B1 | 6/2003 | Sanner | |
| 6,711,848 B1 * | 3/2004 | Gammieri ............... | A01K 85/02 43/35 |
| 6,868,632 B1 | 3/2005 | Heck | |
| 6,941,695 B2 | 9/2005 | Minegar | |
| 7,698,852 B1 | 4/2010 | Cox et al. | |
| 8,020,337 B1 | 9/2011 | Batton et al. | |
| 8,201,358 B2 | 6/2012 | Dohi | |
| 2003/0172579 A1 | 9/2003 | Ivarson et al. | |
| 2005/0252073 A1 | 11/2005 | Shay | |

(Continued)

FOREIGN PATENT DOCUMENTS

GB    2501537    10/2013

*Primary Examiner* — Thanh Pham
(74) *Attorney, Agent, or Firm* — Grimes LLC (57) ABSTRACT

A shielded point motion fishing tackle having a twin set of springless, retractable fishing hooks shielded by the body of a live or artificial lure until activated by the force caused by the striking motion of a fish.

17 Claims, 5 Drawing Sheets

(56) References Cited

U.S. PATENT DOCUMENTS

| | | | |
|---|---|---|---|
| 2006/0090389 A1* | 5/2006 | An | A01K 83/02 43/37 |
| 2007/0101634 A1* | 5/2007 | Clapp | A01K 83/02 43/35 |
| 2011/0107653 A1* | 5/2011 | Tsai | A01K 85/02 43/35 |
| 2011/0119984 A1* | 5/2011 | Tsai | A01K 85/02 43/35 |

* cited by examiner

SHIELDED POINT MOTION TACKLE

FIELD OF THE INVENTION

The present invention relates to the field of sport fishing with an artificial lure bait. It capitalizes specifically on the differential pulling force created between a striking fish and a fisherman to put a sliding lure and a sliding twin hook assembly that uniquely shields it points, into motion at just the right moment and without the use of dangerous springs or trigger devices. The present invention provides a practical means to protect against hook points snagging objects or causing dangerous stab wounds, yet the overall hook and lure assembly remains practical, stealthy and effective in catching fish. Thus, the present invention, using advantageous sliding tackle, uniquely delivers a high level of safety, ease-of-use, minimum frustration and less wasted time and cost caused by sharp points snagging people or objects in, or out of the water.

BACKGROUND OF THE INVENTION

Recreational fishing is one of the more popular leisure time activities enjoyed by sportsmen everywhere. Most commonly, recreational fishing is done with a fishing rod, line and a hook and some form of artificial or live bait. There is a wide variety of shapes and designs of fishing tackle available in the industry today. A good resource showing different types of fishing tackle can be found at www.cabelas.com and www.basspro.com. Recreational fishing has grown worldwide to become a multibillion dollar industry. In the United States alone, the fishing industry encompasses more than 30 billion dollars annually and employs over 300,000 people.

Although most styles of commercial artificial fishing lures are fairly easy to use, they provide almost no protection at all from snags or puncture wounds from their incredibly sharp points.

Every fisherman, when casting around waters filled with reeds, grasses, dead branches, etc., knows all too well how difficult it is to keep the hook points from snagging objects in, or out of the water. A great deal of time is wasted unhooking barbed points from grasses, limbs and anything else in the way. In addition, many fishermen have experienced firsthand the reality of puncture wounds and clothing tears either on themselves or to others. In fact, stab wounds are pretty common while handling and casting tackle with sharp hooks. A surprise prick on a finger can happen, on occasion, just by reaching into a tackle box. In addition, common artificial lures usually have either very small treble hooks dangling off of them or they have one or more fixed hooks sticking out. All have dangerous and exposed points that even a fish can sense quickly while investigating or striking the bait lure. This can decrease the opportunities for capture, as well. Some lures use two or more treble hooks that are usually somewhat smaller hooks than would normally be desired since larger treble hooks would overwhelm the lure and add weight. Most lure manufacturers use small treble hooks and a lure no longer than 17-20 cm long might have up to 2-3 sets of treble hooks hanging off of it just to ensure a fish is hooked. Handling these lures safely is always tricky and a challenge. Also, if you happen to catch a large sport fish on an undersized treble hook, it is much easier for a fish to jump back off of the hook. Sizing the hook properly for the lure and being free from snags and/or puncture wounds has been a difficult issue to solve for manufacturers of lures.

There have been a number of fishing tackle designs attempting to solve these safety and non-snagging issues. Many have tried to incorporate some type of motion hook device in the attempt. Unfortunately, almost all of these motion hooks employ the use of a cocked spring with a trigger mechanism in an effort to mobilize or snap hooks out to catch a fish. Few are truly practical. Plus, these spring hook designs are inherently risky to handle, especially for children and novices, and don't generally integrate or function well with a wide range of artificial lure shapes and sizes. Some are very complex and impractical due to weight, bulk and cost to produce. A person rarely, if not ever, sees a spring hook device on the shelf of any major sporting goods stores possibly due to liability concerns and the fear of accidentally firing the hook points out into someone's hand. The present invention overcomes the need to use springs or triggers to move hooks into, and out of a desired position. Spring hook devices are also illegal in some jurisdictions. Spring hooks and other designs to place hooks in motion have been disclosed in patents and other publications listed below.

U.S. Pat. No. 4,570,373 discloses a barbless fish hook containing a guard member formed of spring wire whereby the guard member may be deflected away from the point where the hook is set in a fish and thus prevents the fish from being dislodged from the hook. This particular hook is based on spring action, is cumbersome in design and is likely to be ineffective in operation or in retaining a fish.

U.S. Pat. No. 3,727,340 discloses a fish hook construction which is characterized by a first pair of like short hooks encompassed by a second pair of relatively long hooks and wherein said hooks are oriented and coordinated in a manner that both pairs of hooks are normally nested together and closed in a manner to render the structure effectively snag less. Hooks spring out to open when portions are grasped and squeezed by a fish. This is a spring actuated hook system and it is doubtful that it will work at all. Second, it probably won't work hidden inside a lure. The question that remains is how would a fisherman use it? It does not seem practical or useful.

U.S. Pat. No. 4,723,372 discloses a fish hook that has a flat barbless point which is specifically shaped to penetrate and remain embedded in the fish. This particular hook is not likely to enhance penetration into the flesh of a fish or prevent an active sport fish from dislodging or jumping off the hook.

U.S. Pat. No. 5,097,622 describes a barbless fish hook assembly incorporating a sleeve of material proximal to the barbless fish hook for setting the fish on the hook body. It is unlikely the presence of a sleeve material will provide sufficient resistance to secure the fish on the hook. Furthermore, the addition of a sleeve to the hook assembly would add unnecessary complexity and costs to the manufacturing process.

U.S. Patent Application 20030172579 discloses a barbless fishing hook with a shank having a longitudinal axis with a spike at one end and adjacent and proximal to the spike having a radially expanded surface extending outward from the longitudinal axis in the form of an protruding budge to presumably provide a surface on which the fish will adhere after engaging the hook. This hook design is unlikely to be an effective means of capturing a fish where the fish is retained successfully since the injury to the fish from this hook will provide an efficient path for the hook to dislodge from the fish.

U.S. Pat. No. 5,890,314 discloses a self-setting configuration for weed less fishing lures. This invention employs a spring biased dual hook assembly with an accompanying set of latch tabs permitting the two hooks to be cocked into a stable position inside the lure. The assembly is subject to automatic release by a tug on the fishing line by snapping the hooks into a stable position with hooks forced outside the lure into the fish's mouth. This is a spring triggered design that uses words like elastic wire to describe a spring. This lure might even trigger just by casting forces. This does not seem practical for actual use.

U.S. Pat. No. 6,574,908 B1 discloses a fishing lure with spring-loaded hooks. The fishing lure includes housing in which a pair of fishing hooks is enclosed. One end of each hook is secured to a spring-loaded plunger held in a hook retracted position by a trigger. The trigger is a spring plunger that is supposedly activated when a fish bites on the lure. When the trigger is activated, the plunger is released and the spring drives it forward. It suggests the hooks are driven into the fish's mouth with a sufficient force so that they cannot be dislodged by the movement of the fish. This sounds invention depends on where the hooks penetrate the fish in order to secure it. This seems a cumbersome and heavy spring action design that appears to be a hazard to anyone using it.

U.S. Pat. No. 6,868,632 B1 discloses a fishing lure comprising of at least one hook, a pivot pin about which the hook can pivot, a trigger which serves to engage the hook so when a fish takes the lure, the trigger is disengaged from the hook permitting them to extend outward and engage a fish. This design seems to be unusable. This is not a hook system that can be put into a variety of artificial lures nor can one use live bait with it. It does not appear to be a useful design.

U.S. Pat. No. 6,941,695 B2 discloses a fishing lure assembly having concealed retractable hooks. The fishing lure assembly has a latch in its interior to inhibit the movement of the hooks.

Pressure on the hook section can cause the latch to release the hooks to engage a fish. This is a spring hook system and it is not clear how it will work. This invention uses code words like "bias" to cover that fact that springs move the hooks into place. The trigger system also appears to be unsafe. Hooks that are opposite facing yet not over lapping will limit the lures and the hooks sizes that could be used. This spring device may not survive a hard cast by the fisherman.

U.S. Patent Application 20050252073 discloses a modified fish hook for catch and release applications wherein it is desired to inflict minimal damage to the fish and thus to release the fish in a healthy state after it has been caught. The hook comprises an eye, shank, bend point and one or more dogs located on the bend, shank or both of the hook. The dogs will comprise non barbed raised surfaces or structures. This invention is a barbless hook with non-barbed projections on its surface. This is intended to retain the caught fish on the hook until it can be safely removed and returned to the water. The fish, however, is unlikely to be retained on the hook. The raised surfaces, or dogs as they are referred to, seem wholly insufficient to hold and active jumping sport fish.

U.S. Patent Application number US 2007/0101634 A1 discloses a fishing lure assembly that is weed less because the hooks are retracted into a housing that prevents the assembly from snagging weeds and getting caught in debris. The assembly includes a fulcrum about which the hooks are spring-loaded. A trigger is rotatable and secured within the housing. When a fish moves the trigger, the hooks are released to catch the fish. It seems impractical for artificial lures and is a spring activated device. Also, grasses, branches, general handling and casting might move the trigger and set the hooks in motion.

U.S. Pat. No. 7,698,852 B1 discloses a fishing lure which has retractable hooks, and a spring portion mounted around a pin within the lure body. Each hook is retained in a cocked position. A forward pull on the rod releases the trigger to move forward freeing the coiled portion of the spring to unwind causing the hooks to be extended. This is another spring activated hook system that requires unique mechanisms that add cost, weight and throw a lure off balance. This trigger may, in fact, release the hooks during a hard or violent cast or just in general handling.

U.S. Pat. No. 8,020,337 B1 discloses an automatic setting of a fish hook assembly comprising 2 hooks pivotally secured to a common shaft, a coil spring installed on the shaft between the hooks, and a latch to hold the 2 hooks together. The latch is disengaged when a fish strikes the assembly, and the hooks are automatically set in the mouth of the fish. This does not seem to be useful or practical. It is not clear if this is for live bait or an artificial lure. In either case, it does not appear to be efficient for fishing and seems clunky and impractical.

U.S. Pat. No. 8,201,358 discloses a barbless hook equipped with a plurality of grooves formed beneath the hook tip, where the barb is generally provided, thus avoiding damage to a caught fish. The presence of grooves on a fish hook located beneath the barbless spear is unlikely to be efficacious to retaining the fish after it is hooked.

UK Patent Application GB 2501537 discloses a fishing lure with deployable hooks. The fishing lure allows the selective deployment of the hooks that are attached to an elongated central core, a hook anchor collar that is slidable and rotatable disposed on the central core, a spring and a hook guide. When the lure is bitten by the fish, the hooks are released by the action of the spring to deploy the distal ends of the hooks beyond the lure. This design uses expensive custom parts and a spring that add weight and complexity. It is not clear how this invention could work in a common lure. Spring lures generally cannot be casted so they become impractical for everyday fishing with a lure.

SUMMARY OF THE INVENTION

Artificial bait lures come in a variety of color patterns, styles, sizes, shapes and forms for fisherman to use. These artificial baits might be in the form of plugs, spoons, soft plastics, rigid plastics, spinners, metals or even wooden materials while being made up to look like worms, shrimp, bait fish, frogs, bugs or just about anything else imaginable. Yet, every artificial bait lure comes with the same discomforting characteristic, they all have at least one or more attached, dangling and exposed hook points protruding at all times whether in use or sitting in a tackle box. Many lure manufacturers attach one or more treble hooks, while others might have just one larger hook extended. The incredibly sharp points of these lures tend to get caught on everything including body parts, clothing or any other object the points come in contact with in or out of the water.

The present invention discloses an improvement in basic design and functionality of an artificial fishing lure using sliding motion and twin hook design. The present invention has two primary components that move when activated by the pull of a fish and/or fisherman on the line: the sliding artificial lure with embedded hollow capsule chamber and retractor pin; and, twin counter-rotating hooks in an assembly that can also slide somewhat independently up and down inside a lure capsule chamber. The ability of the lure and embedded capsule chamber to slide in one direction by the pull of a fish, while at the same time the hook assembly is pulled in the opposite direction by the pull of the fisherman will rapidly extend the hook shanks around an arc when a fish strikes.

The unique overlaid twin hook assembly can be embedded into virtually any style, color, form or size artificial lure by a manufacturer. The present invention lure will have a channel cut through from one side to the other side just wide/long enough to allow overlaid twin hooks to swivel through the lure. There would also be a small channel hole cut into the front end and down through the inner middle section of the lure. Another larger chamber would be cut out of a section of the lure connecting a small channel hole at the top end and down to the side to side channel cutout farther down the inside of the lure. This larger chamber would be sized to accept a specially designed and sized hollow capsule chamber to hold a twin hook assembly and connecting member. The connecting member is shown as a ridged rod, but may be constructed of wire, braided line or any other material capable of effectuating the transference of the pulling force between the fishing line and the counter rotating hooks. This cut out lure chamber would have embedded inside it a specially shaped hollow capsule chamber about approximately an inch long, depending on the lure and hooks sizes chosen, that allows an appropriately sized twin hook assembly to move up and down inside the hollow capsule chamber. The lower end of the hollow capsule chamber is completely open with a retractor pin precisely placed and fastened from side to side and extending through the middle of the opening. At right angles to the retractor pin location are short slots cut into the opposite sides of the capsule chamber and running up from the open end to accept, hold in place, as well as, push on the upper shanks of twin hooks that are designed to sit in the slots or slide up inside the capsule chamber. The opposite end of the capsule chamber has a small hole through to the inner hollow chamber of the capsule chamber that allows a connecting rod to enter down through the top end of the lure and reach inside the capsule chamber and connect to an overlaid twin hook assembly. Once inserted into the inner chamber of the lure, the entire lure with embedded hollow capsule chamber and retractor pin, can then slide a short distance up and down the connecting rod as one piece.

The hook assembly is the second component and is made up of two identical and overlaid twin hooks with a specific teardrop shape ending with barbed points on the lower portion of the shanks. The upper shanks have an eyelet that lays flat and in line on the same plane as the hook shanks but on the outside of the shanks upper ends. The hooks are then laid on top of one another with the points facing in opposite directions. The eyelets are then aligned with the eyelet of a connecting rod placed in between the two hook eyelets. A fastener device is threaded through the three eyelets and tightened to a specific torque that allows the hooks to be held snuggly in place on the connecting rod, yet swivel, in a counter-rotation manner across one another, when the proper force is applied by the pull of a fish and/or fisherman on the line. This twin hook, fastener axle and connecting rod combination, is called the hook assembly. The hook assembly is placed inside the lure capsule chamber in such a way that the upper hook shanks sit just inside the lower capsule chamber and side slots and the capsule chamber retractor pin threads in between both upper hook shanks so that the pin ends up sitting just under a fastener axle and where the upper hook shanks cross each other. This placement of the hook assembly just inside the lower end of the lure capsule chamber places the hooks automatically into a position where one hook point is shielded by the shank of the other hook, and vice versa. This twin shielded-point positioning is the starting, casting, handling and/or storing configuration for the present invention. Shielding the points in this way virtually eliminates snagging objects in, or out of the water and keeps the hook points stealthy and not obvious to a fish under normal handling and usage. It also dramatically reduces any chances for dangerous stab wounds from the points while in the shielded configuration.

The lower end of the connecting rod is connected as stated to the upper end of the hook assembly eyelets, while the upper end of the rod extends outside the top end of the lure hole and is looped for connection to a fishing line. This allows the fisherman to pull on a fishing line that, in turn, pulls the hook assembly farther up inside the lure capsule chamber when a fish strikes. The lure, with embedded capsule chamber and retractor rod, can slide slightly up and down the connecting rod and somewhat independent of, and over the hook assembly.

Therefore, when a fish strikes and pulls on the lure, the fisherman will feel a tug on the line and pull in the opposite direction of the fish. These two opposing pulling forces move the hook assembly farther up inside near the upper end of the hollow lure capsule chamber at the same time a fish pulls the lure down in the opposite direction. Thus, the upper hook shanks are squeezed together by the capsule chamber slots as well as the inner sides of the capsule chamber and pulled farther up inside the lure capsule chamber, while the lure and capsule chamber are being pulled by the fish in the opposite direction and slightly down over the hook assembly. The collision between the upward moving hook assembly inside the capsule chamber, and the downward moving lure with capsule chamber slots and side walls hitting against the upper hook shanks, is what forces the hooks down and into a counter-rotational movement around the fastener axle to extend the points. The hook shanks and points are then stopped at just the right position in their outward extending arc by the retractor pin which slides up and down, as part of the lure capsule chamber, while positioned between the hook shanks. Once extended and with pulling tension kept on the fishing line, the hooks will lock in place high inside the capsule chamber while in the extended point position to ease in capturing and retrieving a fish. It's important to note, that there are no springs or triggers of any kind involved that could inadvertently fire the points out and into the hands of a user or child. It is only the opposing sliding motions of the hook assembly and the lure that initiates hook point extension. As a fish sizes up the artificial bait to make its first strike, the hook shanks themselves are stealthy and barely visible while both hook points are shielded so that a fish would not sense nor feel any points until it pulls sufficiently on the lure and against the pull of the fisherman on the line. The fish, in many respects, hooks itself by its own pulling action against the line which, in turn, instantly extends the hooks to fill its mouth with two sharp points.

Once a fish is reeled in and removed from a barbed hook and the line tension is therefore released, pulling the lure (with capsule chamber and retractor pin embedded) back up the connecting rod, while the hook assembly is pushed in the opposite direction with the connecting rod, will automatically unlock the hooks and move them in a reverse counter-rotation motion and back into the exact position to shield the points. Now the present invention, with the points shielded, is ready to be stored away or used again safely. The twin hook assembly works exactly the same whether one or both twin hook shanks have barbed points at their ends. In other words, a single barbed hook point design, if desired, would work exactly as the twin barbed hook design. In addition, should a lure be damaged by a fish biting with teeth or be damaged in other ways somehow, the embedded hook assembly can easily be removed from a damaged lure and re-inserted, on site, into a new lure of the present invention. It may be removed or inserted like a cartridge into or out of the snug channel openings of a selected soft body lure. This saves cost, waste and aggravation in having to throw away a properly working hook assembly simply because the lure portion may have been damaged.

BRIEF DESCRIPTION OF THE DRAWINGS

The present invention discloses an improvement in basic design and functionality of an artificial fishing lure. The present invention has two moving and primary components: the sliding artificial lure with embedded hollow capsule chamber and retractor pin; and secondly, the twin counter-rotating hooks and connecting member in an assembly that can also slide somewhat independently up and down inside a lure capsule chamber. The ability of the lure with embedded capsule chamber to slide in one direction at the same time the hook assembly is pulled and sliding in the opposite direction, is the key initiating force for the rapid extension of the hooks when a fish strikes.

DETAILED DESCRIPTION OF THE INVENTION

The present invention has twin hooks that are uniquely designed to counter-rotate into and out of a position that guards and protects the sharp points from snagging obstacles or causing stab wounds, as well as, extend and expose both hook points only when a fish strikes and pulls the bait lure. When in the shielded-point configuration, the present invention brings a whole new level of hook stealth and safety from accidental stab wounds along with less frustration and wasted time from snagging objects in, or out of the water.

The present invention is comprised of parts commonly used in the manufacture of fishing tackle and does not add undue complexity, clumsiness, bulk, weight or cost to produce. It is an easy to use practical device that looks and acts like a common fishing lure but with stealthy twin hooks that capitalize on the normal pulling contest between fish and fisherman as the force (energy) needed to move the hooks properly and at the right moment—all without dangerous springs or triggers. When in the starting configuration, the guarded and stealthy hook points would not be sensed, seen nor felt by a fish initially grabbing at, or investigating the lure bait.

Figure 1A:
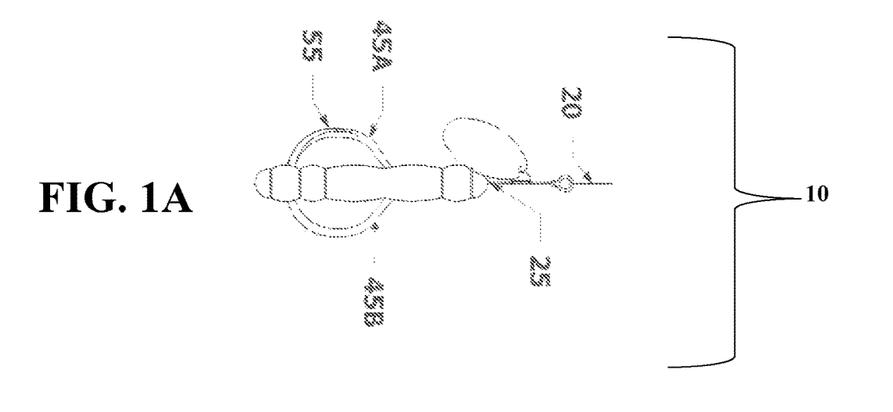
FIG. 1A is the present invention with the twin hooks in the shielded-point configuration.

FIG. 1A is a top view of a sample artificial spinner lure 10 in a shielded-point 55 configuration. This is the starting, casting, transporting or storing configuration when using the present invention. Part of the specially designed tear-drop shaped hook shanks 45A and 45B are shown protruding out the sides (or top and bottom) of lure 10 and remain somewhat stealthy on bait lure 10. A cautious fish would neither sense, feel nor notice any shielded-points prior to striking lure 10. Nor can the points snag objects in, or out of the water. This configuration also greatly eliminates the possibilities for stab wounds on people using the tackle or those nearby. Hook point 55 of hook 45B is shielded by the upper shank of hook 45A. The point of hook 45A is not only shielded from view, but also protected by the upper shank of hook 45B.

Figure 1B:
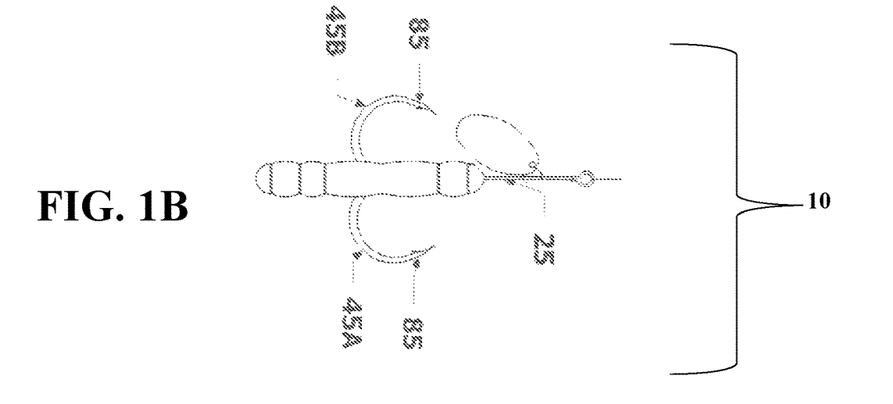
FIG. 1B is the present invention with the hook points fully extended.

FIG. 1B is a top view of a sample spinner lure 10 but with the hooks 45A and 45B fully extended to expose hook points 85 that would be extended inside the mouth of a biting fish as lure 10 was pulled down connecting rod 25 from its starting position. This extended hook point configuration greatly increases the chance of catching a fish due to the wider spread between the twin hook points protruding out of both sides of the lure than a common single or treble hook would offer.

Figure 1C:
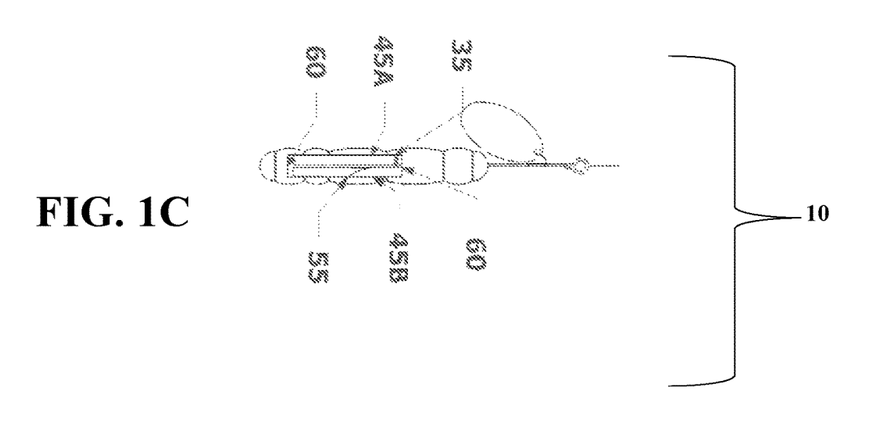
FIG. 1C is a lure side view showing side cutouts to allow movement of the twin hooks.

FIG. 1C is a side view of a sample sliding lure 10 design that is in the shielded-point 55 configuration. It shows the lure side opening 60 that allows hooks 45A and 45B to freely swivel back and forth, in a counter-rotational manner, through the openings 60 of lure 10.

Figure 2A:
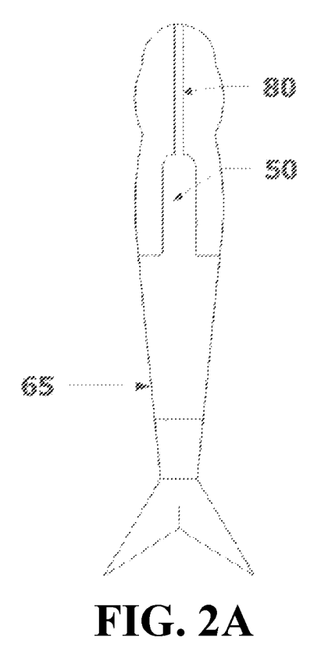
FIG. 2A is an x-ray top view of artificial sliding lure showing inner channel cutouts.

FIG. 2A shows an x-ray top view of a sample lure 10 and illustrates how the hole channel 80 penetrates through the front end of lure 10 and extends down its interior, to allow insertion of a connecting rod, and into a larger inner chamber 50 that would allow insertion of a capsule chamber. This larger capsule chamber 50 extends down into channel 65 that is cut through from one side of lure 10 to the other side to allow twin hooks to counter-rotate in and out of the interior of lure 10.

Figure 2B:
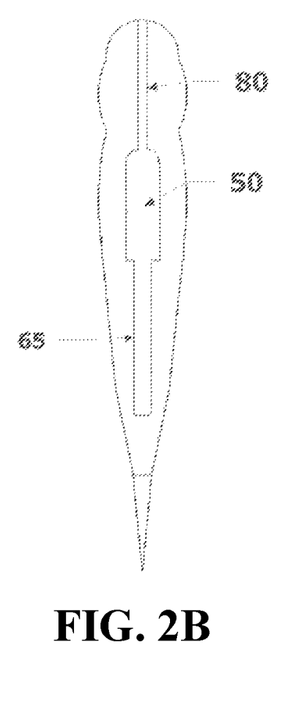
FIG. 2B is an x-ray side view showing inner lure channels.

FIG. 2B is an x-ray side view of lure 10 that illustrates the narrower lower lure 10 channel 65 to allow twin hooks to swivel in an out; and the larger diameter chamber 50 that would encase a capsule chamber. The narrower hole 80 channel extends from the inner large chamber 50 up and out the top end of lure 10 and designed to encase a connecting rod.

Figure 3A:
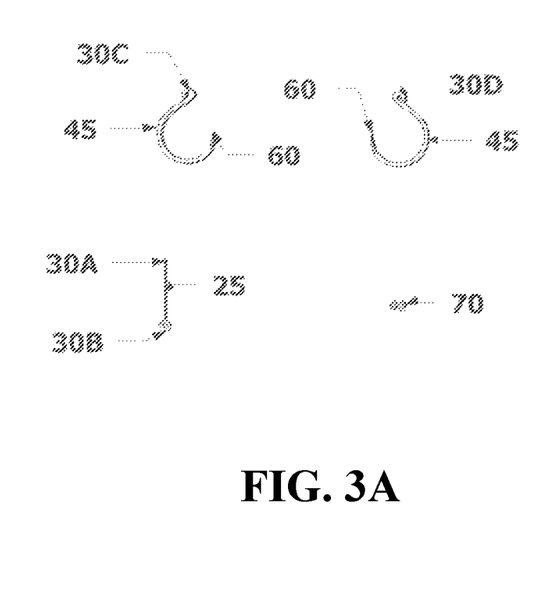
FIG. 3A illustrates each individual part that makes up the hook assembly.

FIG. 3A is a top view of the individual parts of the first major component for the present invention a sliding hook assembly. These are common parts used in the production of artificial fishing lures yet they have a specialized shape, size, connection and useful interaction that is unique to the present invention. FIG. 3A illustrates a connecting rod 25 that has an eyelet 30A for connecting to a fishing line. Eyelet 30B of connecting rod 25 is used to connect in between eyelets 30C and 30D of specially shaped counter-rotating hooks 45A and 45B. Fastener 70 threads through both hook eyelets 30C and 30D with connecting rod eyelet 30A placed in between them. Fastener 70 is used to connect all the parts of the hook assembly together and acts as an axle for rotation as shown in FIG. 4B.

Figure 4A:
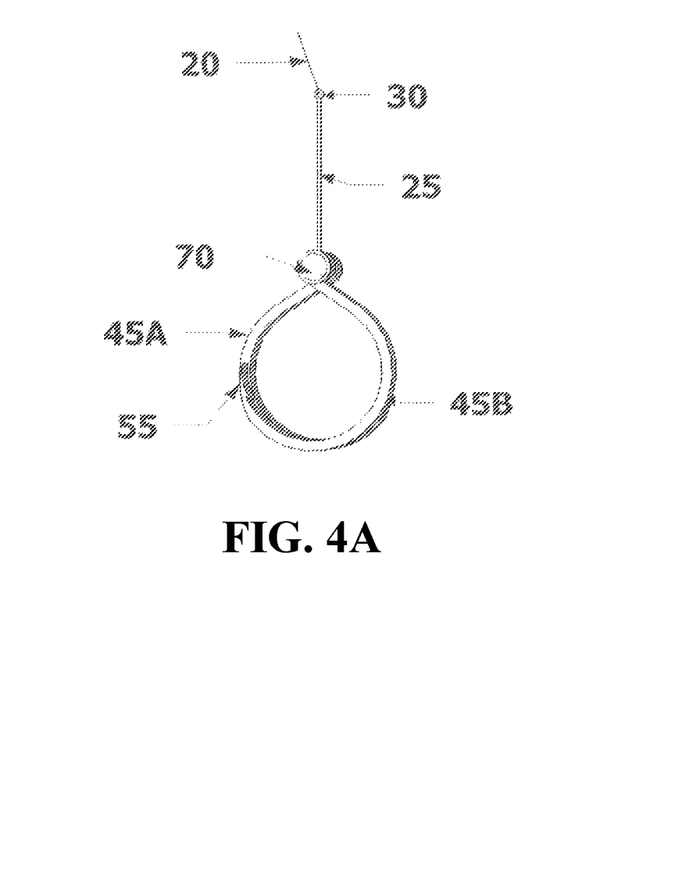
FIG. 4A is frontal view of the hook assembly with shielded-points.
Figure 4B:
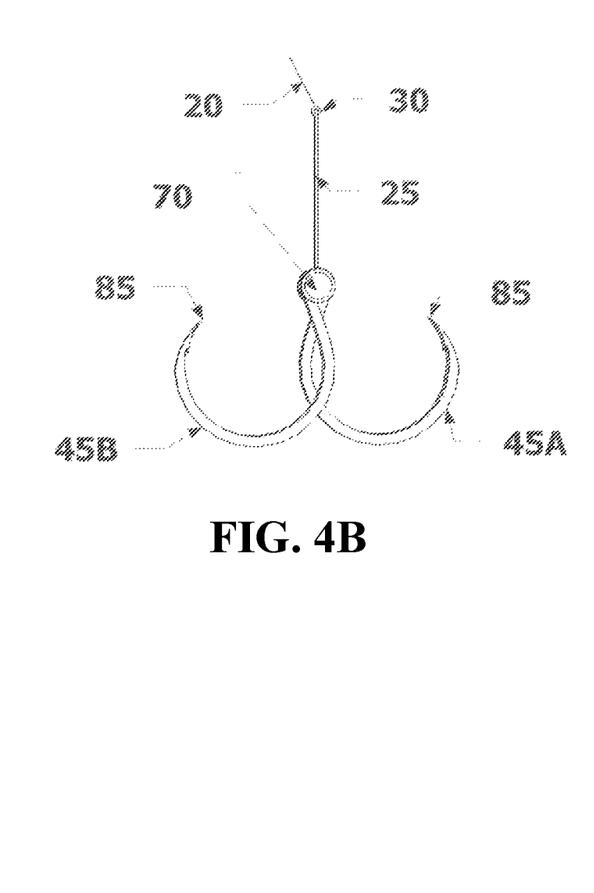
FIG. 4B is a frontal view of the hook assembly with hook points fully extended.

The twin rotating hooks 45A and 45B in FIG. 4A have a somewhat circular lower section and are identical in shape and turned to face in opposite directions during assembly. Having the points 55 facing in opposite directions along with the unique shape of the hooks allow shank 45 of each hook to shield the point 60 on the opposite hook. The special shape and form of these twin hooks 45A and 45B is critical to shielding points. The eyelets 30C and 30D on each hook are turned 90 degrees from a common ordinary fishing hook. This allows each hook to lay flat, and be in line with the plane of the shanks and be stacked on top of one another and fastened to connecting rod 25 as shown in FIG. 4B. Both eyelets 30C and 30D are also precisely formed (looped) on the outside top end of the upper hook shanks 45. This placement is critical in allowing a pin to press up underneath the eyelets 30C and 30D, when assembled, to help move the hook shanks 45 when, and as needed. Connecting rod 25 has eyelet 30B used to connect to the twin hooks with a fastener, while eyelet 30A on the opposite end is used to connect directly to a fishing line.

Figure 3B:
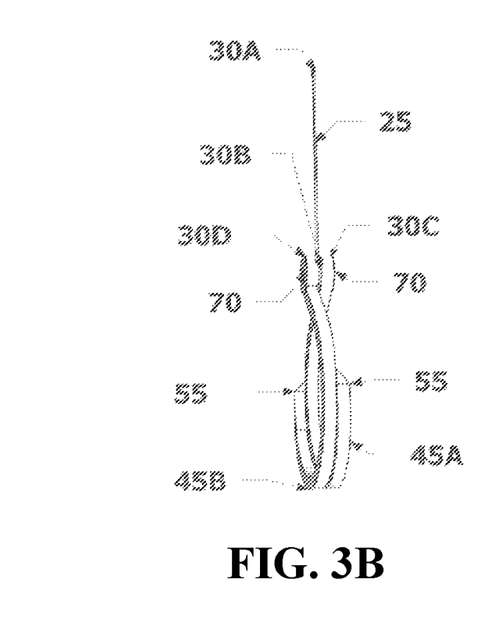
FIG. 3B is a side view of all the hook assembly parts assembled together.

FIG. 3B is a side view of all the parts in FIG. 4A assembled into the first of two major components—a sliding hook assembly. Connecting rod eyelet 30B is inserted in between hook eyelets 30D and 30C and held together with fastener 70 inserted through all three eyelets with the hook points 60 facing in opposite directions. Connecting rod 25 extends upward to connect to a fishing line. Fastener 70 would be torqued to a specified tightness (varied to the size of the hooks used) in order to hold the twin hooks from freely moving, yet allow the twin hooks to counter-rotate across one another when sufficient force is applied such as that of a fish strike. Once assembled as shown in FIG. 3B, fastener 70 also acts as an axle and a point of hook rotation. Hook point 55 on hook 45A is being shielded from snags by hook shank 45B; while hook point 55 on hook 45B is being shielded from snags by hook shank 45A. Twin identical hooks in the present invention allow this shielded-point 55 configuration to help eliminate frustrating and expensive snags and dangerous puncture wounds.

FIG. 4A is a frontal view of a complete hook assembly in the shielded-point 55 configuration. The upper eyelet 30 of connecting rod 25 ties directly to a fishing line 20. Hook 45B overlays hook 45A with both hooks facing in opposite directions and connected to connecting rod 25 with fastener 70. Hook point 55 on hook 45B is aligned with, and bent slightly inward, to lay against the upper hook shank of hook 45A to shield it. Shielded from view is point 55 of hook 45A that is also shielded in the same way by the shank of hook 45B. The special shaping, form and assembly of the identical twin hooks 45A and 45B are the keys to providing this guarded point capability for handling or storing the tackle. Ordinary or common hook shapes found on store shelves today will not provide a shielded-point protection described in the present invention. The ability to effectively shield twin hook points and put them in motion as needed is what sets the present invention apart from all other artificial lures on the market.

FIG. 4B is a frontal view of a hook assembly in the fully extended point 85 configuration. Hooks 45A and 45B have been rotated and extended to a desired arc location that exposes both points 85 simultaneously. This extended configuration is used to hook a fish. Hook 45A and 45B have swiveled in a counter-rotating manner, from FIG. 4A, so that they have slid across one another to expose both points 85. Also, notice that the counter-rotated motion of hooks 45A and 45B have rotated and moved them farther out the opposite sides of the hook assembly. The upper shanks of both hooks 45A and 45B move simultaneously and toward each other and almost align but with a small space left in between both shanks. FIGS. 4A and 4B illustrate the two most useful and desired configurations for the hook assembly: the shielded-point configuration 55 in FIG. 4A; and the extended point 85 configuration in FIG. 5B. A hook assembly is designed to be inserted into an embedded capsule chamber inside a properly designed sliding lure.

Figure 5A:
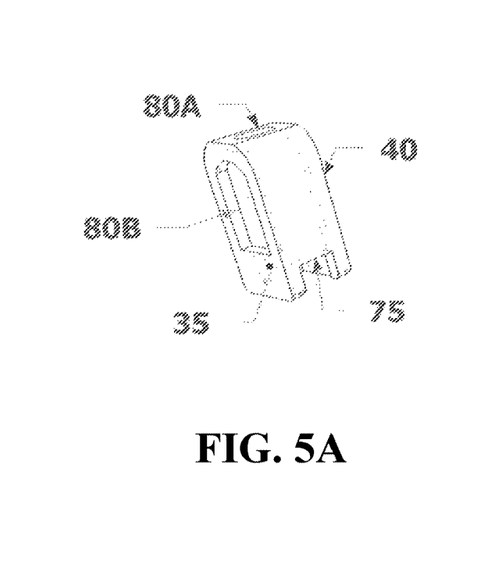
FIG. 5A is a modified side view of a lure capsule chamber.

FIG. 5A is a slanted side view of hollow capsule chamber 40. Capsule chamber 40 could be round, oval or rectangular as long as an appropriately sized hook assembly fits properly inside its hollow chamber. Capsule chamber 40 would be sized according to the hook size and lure size and form chosen but with the general characteristics of FIG. 5A. Larger hooks would require a proportionately larger capsule chamber, lure, etc. Slotted cut outs 75 of capsule chamber 40 help guide, hold and push the upper hook shanks as desired. Retractor pin 35 extends through from side to side of capsule chamber 40 and through the center of the opening near the bottom. The bottom end of capsule chamber 40 is open. The top end of capsule chamber 40 has a small hole 80A through to the inner chamber for a connecting rod to pass through it. Side hole 80B is designed only to save weight in making capsule chamber 40.

Figure 5B:
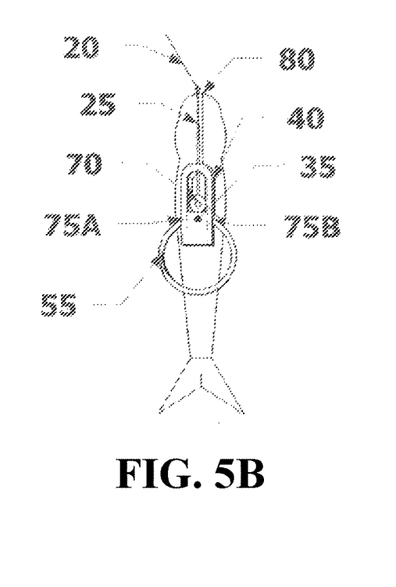
FIG. 5B is a frontal view showing the lure capsule chamber embedded in the lure with hook points shielded.

FIG. 5B is a top view showing how a fully assembled capsule chamber 40 with embedded hook assembly would sit inside sliding lure 10 while in the starting or shielded-point 55 configuration. It shows how an embedded hook assembly would be inserted inside capsule chamber 40; and how capsule chamber 40 would fit inside the inner cut out channels of lure 10 while in a shielded-point 55 configuration. Retractor pin 35 is positioned through capsule chamber 40 so that pin 35 sits just under the fastener axle 70 in this configuration and in between both hook shanks. Pin 35 slides up and down the inner sides of both hook shanks when lure 10 with capsule chamber 40 is in motion and can be used to re-position and swivel hooks in a reverse counter-rotational motion that puts them back into the shielded-point 55 configuration shown. Holding connecting rod 25 with one hand while pulling lure 10 up the connecting rod with the other hand, will return the twin hooks, that have been extended, backward in a reverse counter-rotational motion that returns the hooks into the shielded-point 55 configuration automatically. Retractor pin 35 can slide up between the inside edges of both hook shanks to spread hooks back into a position where the points 55 are guarded. Notice how the upper portion of the hook assembly including fastener axle 70 sits down on top of retractor pin 35 and inside toward the lower end of capsule chamber 40 and with connecting rod 25 passing from inside lure 10 to the outside through hole 80 to connect to a fishing line. Retractor pin 35 also keeps the hook assembly from falling out the bottom of capsule chamber 40. The shielded-point 55 position shown in FIG. 5B is the starting, general handling, transporting and/or storing configuration for the present invention and provides a very high level of safety from snags and stab wounds.

Figure 5C:
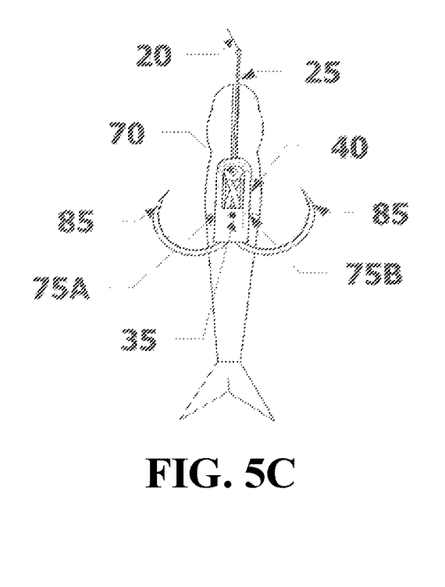
FIG. 5C is a frontal view showing the capsule chamber embedded in a lure with hook points fully extended.

FIG. 5C is a top view showing how a fully assembled capsule chamber 40 with embedded hook assembly would sit inside sliding lure 10 while in a fully extended point 55 configuration. Here, lure 10 has been slid down connecting rod 25 and pulled capsule chamber 40 down over fastener axle 70 and the upper hook shanks by the force of a biting fish. At the same time, fastener axle assembly 70 has been pulled up by fishing line 20 and is near the top of the hollow chamber of lure capsule chamber 40. Thus, the upper edges of both slotted guides 75A and 75B, on opposite sides of the lower end of capsule chamber 40, strike down instantly on the upper hook shanks when the lure is pulled down by a biting fish; while, at the same time, the hook assembly is pulled up sharply in the opposite direction by the pull of a fisherman on the line. The sliding of lure 10 with capsule chamber 40 down connecting rod 25 is but a short distance and would normally be less than around 1-4 cm in most cases. Both hook shanks are now pressed tight against retractor rod 35 and squeezed high inside capsule chamber 40. As the hook shanks counter-rotate across one another and are pressed against retractor pin 35, this narrowing profile of the upper shanks of fastener axle assembly 70 allows fastener axle 70 to be pulled farther up inside and near the top of capsule chamber 40 as shown. When pulled up, the upper hook assembly ends up pressed snug against the inner walls of capsule chamber 40 and also pressed tight against retractor pin 35 at the same time. This positioning locks the hooks in the desired extended point 85 configuration as long as the fisherman keeps a pulling tension on the fishing line. These opposing sliding movements of the present invention fully extend and expose points 85 almost instantly and stop on a proper arc point to capture a fish. Once a fish is hooked, all the pulling forces are transferred onto the hook assembly, connecting rod 25 and fishing line 20. A fish, at this point, would normally let go of lure 10 and fight the hook.

A caught fish is reeled in and removed from a hook as it would be with any barbed hook. After fish removal, tension is released on the fishing line and a user can hold onto connecting rod 25 with one hand, while pulling lure 10 back up connecting rod 25 to a stop position with the other hand. With this motion, retractor pin 35 is also pulled up and slides up in between both inner hook shanks to spread them simultaneously back into the shielded-point 55 configuration, as seen in FIG. 5B, allowing the user to safely handle lure 10 again and in any way desired.

Whether a soft or rigid body lure, the present invention operates the same and just as safely and effectively. The present invention connects to a fishing line like any other common artificial bait lure and does not incorporate clumsy, bulky, external or complex mechanisms to operate safely and effectively. It is exceptionally safe to use, simple in design, inexpensive to manufacture and highly effective. The present invention is not only easy-to-use but connects to a fishing line, casts and reels just like any common lure available today, yet offers an uncommonly high level of safety from puncture wounds and virtually eliminates frustrating snags, cost and wasted time. In addition, a complete hook assembly, capsule chamber 40 and connecting rod 25 assembly can be easily removed/inserted into, or out of a soft body lure 10 side channel opening while onsite should damage occur to some part of the tackle. Hard body lures that snap together to form a whole lure 10 could also be replacement in this way.

NUMERICAL CODES FOR THE INVENTION

10 Artificial lure
15 Hook assembly
20 Fishing line
25 Connecting rod
30 Eyelet
35 Retractor pin
40 Hollow capsule chamber
45 Hook shank
50 Lure channel
55 Shielded-point
60 Hook point
65 Lure side channel
70 Fastener
75 Slotted guide
80 Hole
85 Exposed point

I claim:

1. A shielded-point motion tackle consisting of:
   a. a sliding hook assembly having a first counter rotating hook with a first eyelet and a second counter rotating hook with a second eyelet, said two counter rotating hooks connected to one another and to a connecting member by a fastener with the connecting member having an eyelet-end and a lure-end, said fastener passing through said first eyelet and said second eyelet;
   b. a hollow capsule chamber having a plurality of slots dimensionally sized to allow the first and second counter rotating hooks to pass through the hollow capsule chamber and further dimensionally sized to guide the first and second counter rotating hooks from a non-engaged position into an engaged position as the first and second counter rotating hooks swivel about an axis defined by the fastener after an application of a longitudinal force on the connecting member directed towards the eyelet-end of the connecting member and/or the application of a longitudinal force on the hollow capsule chamber directed towards the lure-end of the connecting member; and
   c. wherein each of said counter rotating hooks has a shank and a point, and wherein the shank of the first counter rotating hook is dimensionally sized to shield the point of the second counter rotating hook in the non-engaged position and the shank of the second counter rotating hook is dimensionally sized to shield the point of the first counter rotating hook in the non-engaged position.

2. The shielded-point motion tackle of claim 1 wherein the entire shielded-point motion tackle is substantially embedded in a live bait or an artificial fishing lure.

3. The shielded-point motion tackle of claim 1 wherein each of the first and second counter rotating hooks has an interior side facing the other hook and an exterior side facing away from the other hook and wherein each of the first and second counter rotating hooks has a barb formed into the interior side such that there are no exposed sharp points when the shielded-point motion tackle is in said non-engaged position.

4. The shielded-point motion tackle of claim 3 wherein the first eyelet is joined to the exterior side of the first counter rotating hook and the second eyelet is joined to the exterior side of the second counter rotating hook.

5. The shielded-point motion tackle of claim 1 wherein a torque is applied to the fastener to hold the first and second counter rotating hooks snuggly in place in the non-engaged position, whereby the first and second counter rotating hooks will not rotate from the non-engaged position to the engaged position without an application of a sufficient longitudinal force.

6. The shielded-point motion tackle of claim 5 wherein the amount of said torque is adjustable by a user to accommodate various longitudinal forces needed for different size and species fish.

7. The shielded point motion tackle of claim 1 wherein said hollow capsule chamber has a retractor pin which prevents motion of said two counter rotating hooks when said retractor pin comes into contact with said first eyelet, said second eyelet and said fastener.

8. A lure consisting of:
   (i) a shielded point motion tackle consisting of:
      a. a connecting member having an eyelet-end and a lure-end; and b. a sliding hook assembly having two counter rotating hooks further consisting of a first counter rotating hook and a second counter rotating hook, said two counter rotating hooks connected to the connecting member by means of a fastener at the lure-end of the connecting member;
(ii) an outer casing having a plurality of interconnected interior channel openings with said channel openings dimensionally sized to accommodate passage of said two counter rotating hooks when said hooks are deployed; and
(iii) wherein
   a. each of said counter rotating hooks has a shank and a point, and wherein the shank of the first counter rotating hook is dimensionally sized to shield the point of the second counter rotating hook in a non-engaged position and the shank of the second counter rotating hook is dimensionally sized to shield the point of the first counter rotating hook in the non-engaged position,
   b. a hollow capsule chamber consisting of:
      (i) a plurality of slots dimensionally sized to allow the first and second counter rotating hooks to pass through the hollow capsule chamber and further dimensionally sized to guide the first and second counter rotating hooks from the non-engaged position into an engaged position as the first and second counter rotating hooks swivel about an axis defined by the fastener after an application of a longitudinal force on the connecting member directed towards the eyelet-end of the connecting member and/or the application of a longitudinal force on the hollow capsule chamber directed towards the lure-end of the connecting member; and
      (ii) a larger inner channel which acts as a containment area for encasing the sliding hook assembly with the inner channel connected to a lower channel opening that extends from a first side of the outer casing of either a live bait or an artificial fishing lure to a second side of said outer casing and allows the hooks to move in and out of the outer casing when the hooks are in motion.

9. The shielded point motion tackle of claim 8 wherein the hollow capsule chamber has side cutouts dimensioned to hold and guide the movement of said two counter rotating hooks.

10. The shielded point motion tackle of claim 8 wherein said outer casing is a soft body lure having openings to allow for easy replacement of the soft body lure by a fisherman when the soft body lure becomes damaged in some way.

11. The shielded point motion tackle of claim 8 wherein said first and second counter rotating hooks each have a lower half and an upper shank portion with each of said counter rotating hooks formed in a semi-circular manner with each of said upper shank portions having an attachment eyelet positioned on an outer-side of each of said upper shank portions with each of the first and second counter rotating hooks formed to shield the point of the other hook when said counter rotating hooks are in said non-engaged position.

12. The shielded point motion tackle of claim 8 having a retractor pin which initiates hook movement in reverse to re-position the points from said engaged position into said non-engaged position upon application of a reverse longitudinal force on the connecting member directed away from the eyelet-end of the connecting member and/or the application of a reverse longitudinal force on the hollow capsule chamber directed away from the lure-end of the connecting member.

13. The shielded point motion tackle of claim 8 having a retractor pin wherein the retractor pin penetrates a lower open end of said hollow capsule chamber and is positioned to rest in-between, and up against an interior portion of both hook shanks at all times thereby preventing the hook assembly from falling out or being pushed out the lower open end of the hollow capsule chamber.

14. A shielded-point motion tackle consisting of:
a. a sliding hook assembly having:
   (i) a first counter rotating hook with a first eyelet; and
   (ii) a second counter rotating hook with a second eyelet;
said two counter rotating hooks connected to one another and to a connecting member by a fastener with the connecting member having an eyelet-end and a lure-end, said fastener passing through said first eyelet and said second eyelet, wherein a torque is applied to the fastener to hold the first and second counter rotating hooks snuggly in place in the non-engaged position, whereby the first and second counter rotating hooks will not rotate from a non-engaged position to an engaged position without an application of a sufficient longitudinal force;
(b) a hollow capsule chamber having a plurality of slots dimensionally sized to allow the first and second counter rotating hooks to pass through the hollow capsule chamber and further dimensionally sized to guide the first and second counter rotating hooks from the non-engaged position into the engaged position as the first and second counter rotating hooks swivel about an axis defined by the fastener after an application of a longitudinal force on the connecting member directed towards the eyelet-end of the connecting member and/or the application of a longitudinal force on the hollow capsule chamber directed towards the lure-end of the connecting member; and
(c) wherein:
   (i) each of said counter rotating hooks has a shank and a point, and wherein the shank of the first counter rotating hook is dimensionally sized to shield the point of the second counter rotating hook in the non-engaged position and the shank of the second counter rotating hook is dimensionally sized to shield the point of the first counter rotating hook in the non-engaged position;
   (ii) each of first and second counter rotating hooks has an interior side facing the other hook and an exterior side facing away from the other hook and wherein each of the first and second counter rotating hooks has a barb formed into the interior side such that there are no exposed sharp points when the shielded-point motion tackle is in said non-engaged position; and
   (iii) the eyelet of each counter rotating hook is joined to the exterior side of such counter rotating hook.

15. The shielded-point motion tackle of claim 14 wherein said torque is adjustable by a user to accommodate various longitudinal forces needed for different size and species fish.

16. The shielded-point motion tackle of claim 14 wherein the entire shielded-point motion tackle is substantially embedded in a live bait or an artificial fishing lure.

17. The shielded-point motion tackle of claim 14 wherein the entire shielded-point motion tackle is substantially embedded in a live bait or an artificial fishing lure, and wherein said torque is adjustable by a user to accommodate various longitudinal forces needed for different size and species fish.

* * * * *